Figure 1:
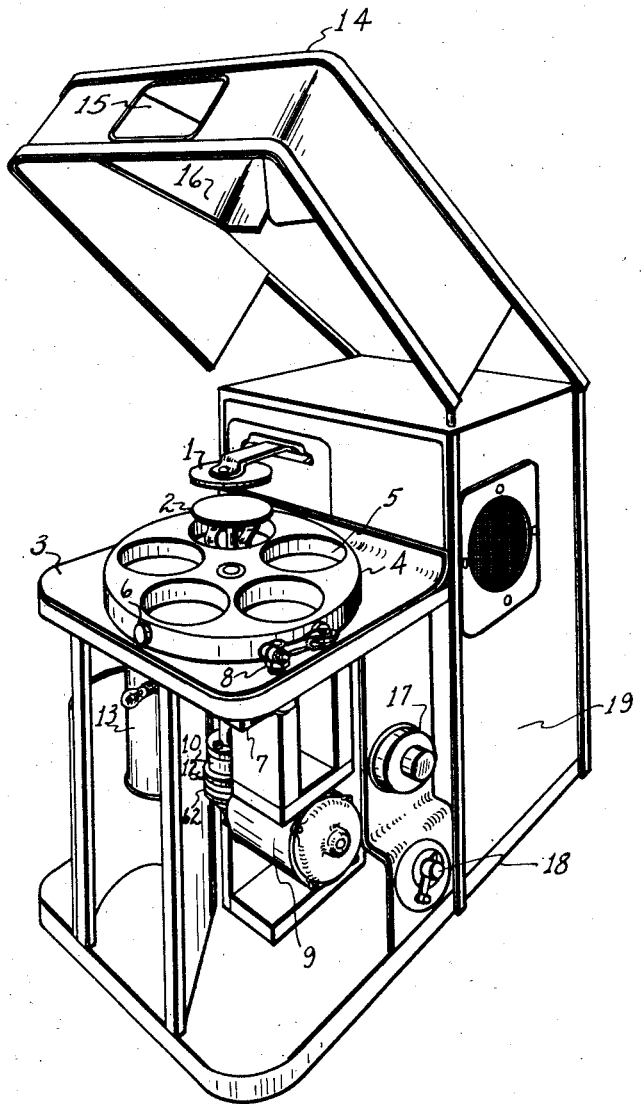

Feb. 5, 1952 W. D. WENGER 2,584,951
APPARATUS AND CIRCUIT FOR HEATING ARTICLES
Filed April 18, 1949 3 Sheets-Sheet 1

INVENTOR.
WILEY D. WENGER
BY Kenneth Swartwood
ATTORNEY

Feb. 5, 1952                    W. D. WENGER                    2,584,951
APPARATUS AND CIRCUIT FOR HEATING ARTICLES
Filed April 18, 1949                                    3 Sheets-Sheet 2

INVENTOR.
WILEY D. WENGER
BY Kenneth Swartwood
ATTORNEY

INVENTOR.
WILEY D. WENGER
BY Kenneth Swartwood
ATTORNEY

Patented Feb. 5, 1952

2,584,951

UNITED STATES PATENT OFFICE 2,584,951

APPARATUS AND CIRCUIT FOR HEATING ARTICLES

Wiley D. Wenger, Danville, Ill., assignor to Electric Eye Equipment Company, Danville, Ill., a corporation of Delaware Application April 18, 1949, Serial No. 88,119

1 Claim. (Cl. 219—47)

This invention relates to a method and apparatus for heating materials by dielectric means. Although particularly intended for heating bakery goods such as rolls of various types, doughnuts and the like, the features of the invention are applicable to heating any type of material having dielectric characteristics and of relatively low electrical conductivity.

Baked goods such as tea rolls, coffee rolls, hard rolls, doughnuts and the like are more suitable for consumption if they are allowed to cool and then re-heated just prior to eating. In the restaurant business, for example, it has been the general practice to bake such items and then reheat them by means of a "warming oven" or cabinet which warms the roll or other food by conduction heating. For example the heat source used heretofore are electrical elements, thermostatically controlled to maintain the cabinet temperature at a fixed value. In this way, by heat transmission from the outside, the baked goods are heated. By such usual heating means, heat penetration into the center of a tea roll, for example, would be very slow, the outside reaching cabinet temperature quickly, the center only after long exposure to the external heating. Thus, the texture of the roll is altered and if left too long, considerable moisture is lost from the product. Actually a very slow continued baking occurs. The roll is not freshened, but rather the "freshness" is rapidly diminished and ageing is accelerated by such continued heating.

My invention uses a high frequency power generator as the heat source. This results in internal heating of the rolls by reason of the well known "molecular friction" theory. My machine as described hereafter makes practical the use of such energy to heat and re-distribute the molecular moisture of the roll in a very short time. The machine also includes necessary controls and handling mechanisms which result in automatic power controls so that small, large, hard, soft, and other miscellaneous rolls will be heated throughout. It is designed so that pre-loading can be accomplished and minimum time is consumed to deliver the heated roll to the ejection position. The art of heating baked goods is, by means of my machine, therefore improved and the use of high frequency heating made practical for such use.

This invention is characterized by the fact that the dielectric properties of the material undergoing heating are utilized to adjust the amount of energy delivered to the material at the beginning of the heating cycle and thus making possible the absorption of power by very small objects as well as larger ones without manual adjustment of the electrodes. This likewise prevents operating the source electrodes at excessive potentials. Thus, within the mechanical limitations of the specific machine being used, baked goods varying in size, mass, density and moisture content are automatically accommodated.

Another feature of my invention resides in the use of the dielectric properties of the material undergoing heating to initiate the heating cycle when said material is in position to be heated.

The aforementioned features of my invention are accomplished by using a high frequency power generator as a capacity relay (i. e. — a relay sensitive to changes in capacity) whereby changes in capacitance between the terminal electrodes of the power generator brought about by entrance of the material to be heated into the heating zone, are reflected as current changes in the vacuum tube of the power generator. Such current changes are utilized to operate one or more relays for automatically initiating the heating cycle and controlling the power output of the generator.

One of the important objects of my invention is to provide a method and means whereby the output of the power generator is maintained, during the heating cycle, at a relatively constant value which approaches but does not exceed the capacity of the vacuum tube utilized in the generator, as distinguished from previous dielectric heaters in which the power output of the generator is varied to maintain a relatively constant heating rate. This novel method and means of control not only avoids overloading of the generator tube, thus minimizing upkeep expense and service on the device, but also utilizes a heating rate which closely approaches the maximum capabilities of the machine regardless of variations in the dielectric characteristics of the material being heated.

A further object of my invention is to provide a method and means of dielectric heating which automatically compensates for variations in the loss factor of the material to be heated. As applied to the heating of rolls and other bakery goods this means that the device will accommodate various sizes and shapes of such goods of varying density and moisture content thereby heating each piece, regardless of such variation, in a minimum of time consistent with the capacity of the generator.

Another object of my invention is to provide a dielectric heating device in which compensation for variations in the loss factor of the material to be heated and control of the power output of the generator at a relatively constant value, are accomplished automatically. This minimizes attention on the part of the operator and obviates errors of judgement and errors in making manual adjustments.

Still another object of my invention is to provide a method and means of dielectric heating in which the power output of the generator is available as soon as the material to be heated enters the heating zone but which conserves the energy of the power generator until it is required for actual heating of said material.

Another object of the invention is to position the material to be heated in the heating zone without resorting to closures such as manually or automatically operated doors or the like, while still providing protection for the operator, and preventing radiation of the high frequency energy of the power generator.

A still further object of the invention is to provide a device of the character described which conserves the power output of the generator when no material to be heated is in heating position and which brings material placed within the device into heating position without delay.

Figures 2, 4:
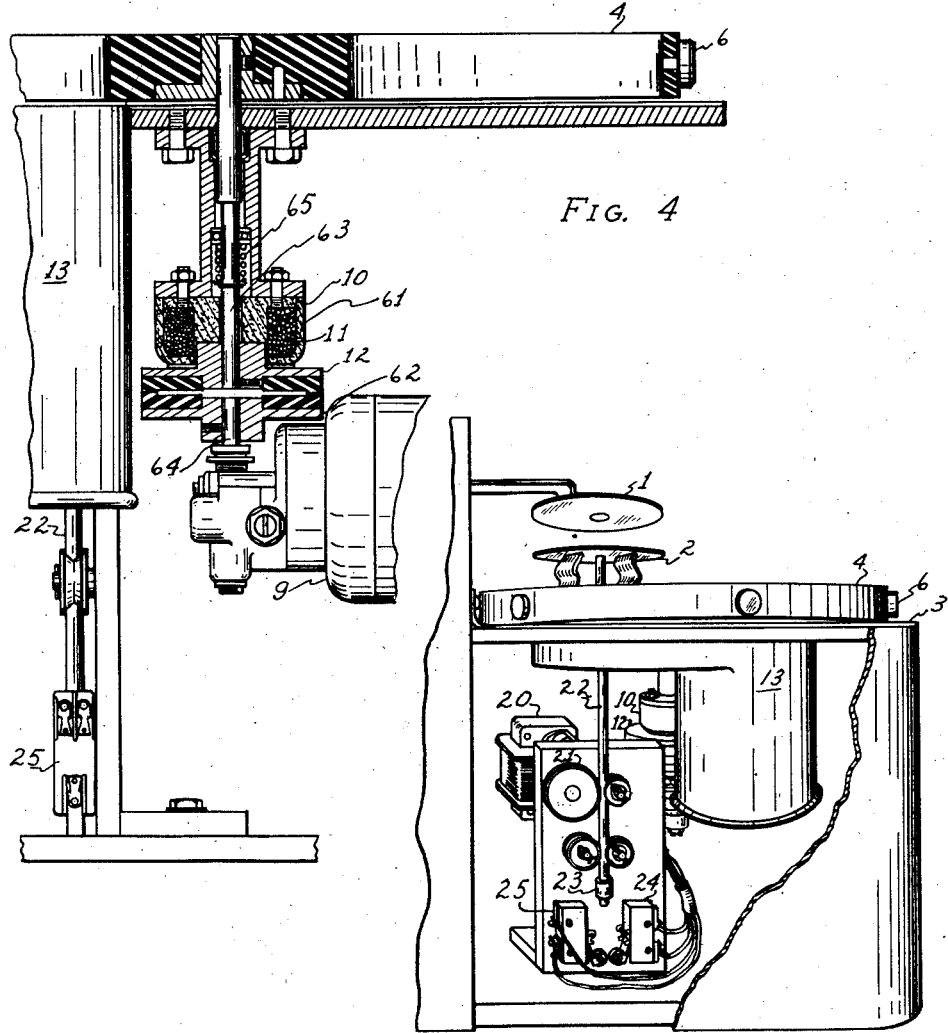
Figure 3:
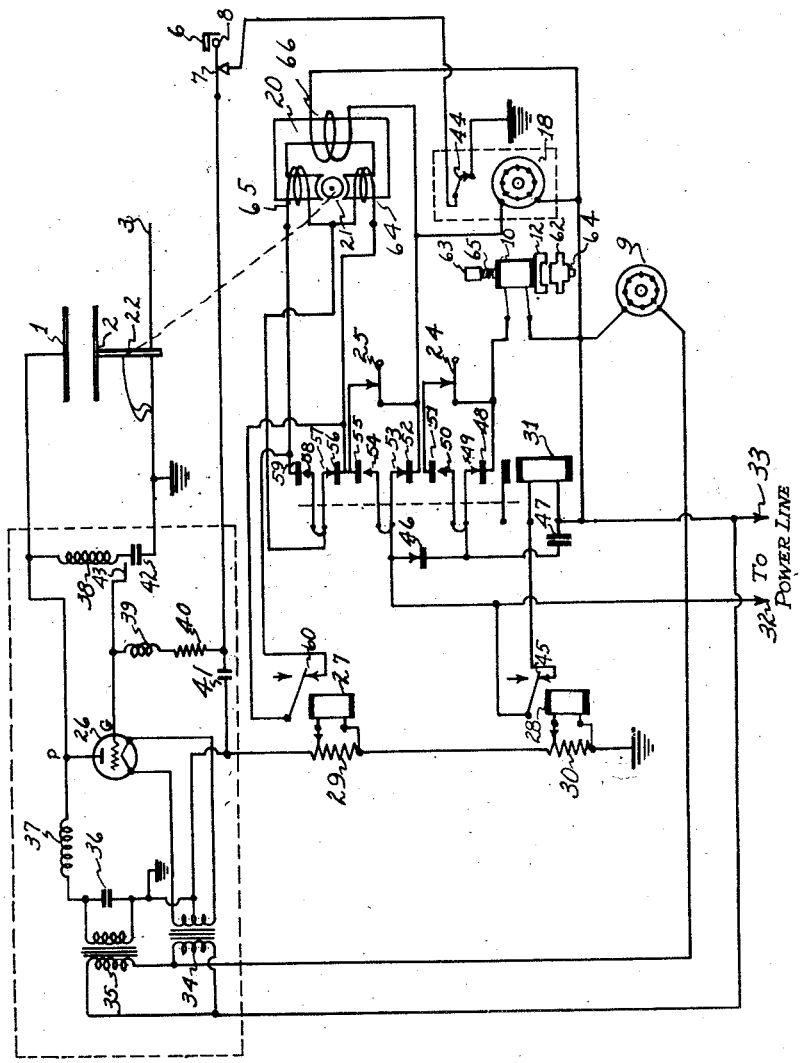

My invention can be further understood by referring to the several drawings in which: Figure 1 shows the high frequency oscillator circuit. Figure 2 is a perspective view of the unit as a whole. Figure 3 shows diagrammatically the control circuit employed. Figure 4 is a partial cross-sectional view illustrating the mechanism of the solenoid valve.

Referring to Figure 1, my invention consists of a high frequency oscillator used as a heat source and which delivers an alternating potential to applicator plates 1 and 2 (Fig. 1). One of the plates 2, is movable and normally rests parallel to the plate 1 and flush with base plate 3. Rotating over plate 3 is a turntable 4 having holes 5. Each of these holes are associated with an index button 6. These buttons are used to initiate a microswitch 7 through an actuating roller 8. A motor 9 rotates the large disc 4, attached to shaft 63, when the clutch 10 is engaged. Clutch 10 consists of two face plates 12 and 62. Plate 62 is firmly attached to the motor drive shaft 64. Clutch plate 12 is attached to shaft 63 and normally is held in contact with plate 62 by virtue of a spring 65, surrounding shaft 63. A portion of plate 12 is a solenoid plunger, acted upon by coil 11, encased in a magnetic housing 61.

Plate 3 is solid except for a slot through which the movable plate 2 moves and the area immediately above the chute 13. A hinged cover 14, is normally closed and rests on plate 3. An opening such as shown at 15 serves as a loading opening, into which a roll would be placed so as to fall into one of the holes of disc 4. Shield 16 is mounted in cover 14. A switch 17 and a timer 18 are also shown on Fig. 1. 19 is a cabinet for housing the complete machine.

By referring to Figure 2, it can be seen that the plate 2 can be moved upward and downward by means of the reversible motor 20 through drive wheel 21 and shaft 22. An attached collar 23 is used to actuate interlocking switches 24 and 25.

In addition, reference to the wiring diagram (Fig. 3) shows that the vacuum tube 26 used as a source of high frequency power, has connected in series with its elements, the relay 27 and the relay 28, each of which are shunted by the adjusting resistor 29 and 30. A third relay 31, having three sets of contacts, is actuated by relay 28.

My invention operates, briefly, as follows: A roll, doughnut or other product is inserted in the opening 15 (Fig. 1) and falls into an opening such as 5 in the disc 4. The disc 4 is normally revolving continuously and it is driven by the motor 9 through the clutch 10. Each time an index button such as 6, passes under the roller arm assembly 8, high frequency power is momentarily delivered to plates 1 and 2 so that when the roll is brought into the position directly between plates 1 and 2, it receives an electrical potential and consumes power which is converted into heat. This absorption of power from my generator causes its normal current to increase by virtue of such electrical loading being applied. Relay 28 (Fig. 3) then closes and this in turn initiates relay 31. Power is then applied to clutch coil 11, which is contained in housing 10, disengaging the motor 9 from the clutch disc 12 and magnetically applying a brake to disc 4 by reason of the pull created against plate 12 by the magnetic field created in the coil 11. Details of the clutch mechanism is shown in Figure 4.

Now at the same instant, relay 31 energizes motor 20 (Fig. 2) which pushes shaft 22 upward, carrying the roll closer toward the high potential electrode plate 1. This causes the loading on my generator to increase by virtue of a diminishing the resistance of the air gap between the roll and the top plate 1. When the air gap has been reduced so that the loading on the generator has caused the current through the tube elements to reach a pre-set value, relay 27 closes. An electric brake is then applied to the motor 20, plate 2 remaining stationary until timer 18 has reached a pre-set value of a few seconds. When the pre-set time is measured, all current through the relays 27, 28 and 31 is interrupted. Motor 20 is thus reversed, the roll is returned to the level of plate 3, the disc again is revolved and the heated roll is dropped through chute 13 and delivered to the operator. If there is another roll in a following hole in disc 4, it will cause the same cycle to take place when it reaches a location between plates 1 and 2. If no other rolls are in the holes of the disc 4, continuous rotation will occur. It can be seen therefore, that my device makes possible rapid heating and dispensing of rolls, doughnuts and the like with minimum waiting, with minimum power consumption and the device can be loaded and unloaded safely by more than one person simultaneously. In addition to the benefits of high frequency heating, no multiplicity of storage compartments exists to prevent removing a roll from one while another is in use.

Likewise, my automatic sensing device which initiates the heating cycle makes possible a safe yet rapidly operating machine. If, for example, the disc stopped as each opening came under plate 1, then a wait four times as long, to heat one roll would confront the operator each time the disc became empty. The indexed holes in disc 4 serve to permit pre-loading of more than one roll, places the high potential electrode within a protected area to prevent possible contact by the operator, and allows electrical shielding to be incorporated to reduce radiation of high frequency energy. In addition, this machine makes possible the easy loading and removing of a roll by using one hand. This is important since waitresses usually hold a tray while accumulating a customer's order. No drawers or doors on my device improves utility.

Detailed operation of the machine can be understood by referring to wiring diagram shown in Figure 3 along with Figures 1 and 2.

A power line is connected to terminals 32—33 thus energizing this machine. Components shown in dotted area as 26, 34, 35, 36, 37, 38, 39, 40, 41, 42 and 43 compose a standard high frequency oscillator which delivers a potential to plates 1 and 2. A high alternating voltage is applied by transformer 35 to vacuum tube 26 and the oscillatory circuit 38, 42, 43, and 1 and 2. Plates 1 and 2 are a part of this oscillatory circuit and represent a tank capacity having an air dielectric. The grid circuit of the oscillator is connected through switches 7 and 44 to the ground return path. The tube 26 cathode return circuit is connected through resistor 29 and 30 to ground.

All relay and switch contacts are shown on Fig. 3 in an operating position, as when a roll is being heated.

A roll reaching the area between plates 1 and 2 at the same instant button 6 closes switch 7 results in a current rise through 29 and 30 due to a change in current of the tube 26 by virtue of the loading as caused by the material in the heating zone.

Relay 28 closes in response to the slight increase in current through resistor 30 above the normal minimum. When relay 28 closes, contact is made to terminal 45, which energizes relay 31, the latter is powered by direct current from rectifier 46 and condenser 47. When relay 31 is energized it pulls downward, so that contact 49 completes, through 48, a circuit to the solenoid clutch and break mechanism 10. Thus the solenoid is energized so that motor 9 is mechanically disengaged from the disc 4 and the roll stays in position between plates 1 and 2. Simultaneously, contacts 52 and 53 close and apply an alternating current to the field winding of motor 20 and the timer motor 18. The timer then begins to measure a pre-set interval.

At this same instant contacts 56 and 57 have closed, thereby applying induced currents into the counter clockwise shading coil 64 of the motor 20 which causes it to rotate and lift the plate 2 by means of the shaft 22. When shaft 22 rises, interlocking switch 24 closes its contacts thereby holding current on clutch 10. Then interlocking switch 25 closes and holds a current on the timer 18, and on the field winding 66 of the motor 20 in case relay 31 is opened.

Meanwhile, as plate 2 is raised upward with its roll, current through resistor 29 reaches a predetermined value, relay 27 closes and through contact 60 a short circuit of both shading pole windings 64 and 65 results in motor 20 stopping by means of the electric brake action heretofore described. Maximum high frequency power is then delivered to the roll by the tube 26 until the timer 18 has measured the pre-set interval. At the conclusion of the interval, switch 44 momentarily opens thereby blocking the current through tube 26 by virtue of a high bias being applied by condenser 41.

Current through resistors 29 and 30 goes to zero. Relays 27 and 28 open, relay 31 opens. When relay 31 opens, contact 58 and 59 closes to short the reverse winding on motor 20 and the plate 2 returns to the level of plate 3. At the same time contacts 54 and 55 have closed to maintain current through motor 20 and timer 18 through switch 25. Thus timer 18 is stalled while plate 2 is returned to the down position. Likewise, contacts 50 and 51 have closed and maintain current in clutch 10 through switch 24, thus holding the disc 4 stationary until the plate 2 is returned to the down position.

When the plate 2 gets down to the level of plate 3, collar 23 on the shaft 22 initiates switch 24. This opens the circuit to clutch 10, thus letting motor 9 again revolve the disc 4. Likewise switch 25 is opened by the collar 23 and the field 66 of motor 20 is de-energized. Timer 18 is also de-energized to its re-cycle position. This again closes contact 44 so that pulses through switch 7 will again energize tube 26 and the rest of the mechanism.

Other embodiments of my invention will become apparent to those skilled in the art.

I claim as my invention:

An apparatus for heating articles comprising a source of high frequency current including a generator, a dielectric heating zone defined by a pair of plates serving as electrodes, said electrodes connected to said generator and one of which is moveable relative to the other, a turntable operatively connected to a motor through a solenoid clutch, said turntable having means therewith for bringing an article to be heated between said plates, means connected to said generator and plates controlling the relative movement of said plates and thereby the amount of power input to said articles responsive to the initial loading of said generator due to the article being heated between said plates, said clutch having engaging and releasing means controlled by said solenoid responsive to operative means connected to said generator and said solenoid and said operative means thereby being initially energized when said generator reaches a predetermined minimum output and means for deenergizing said solenoid prior to each inspection.

WILEY D. WENGER.

REFERENCES CITED

The following references are of record in the file of this patent:

UNITED STATES PATENTS

| Number | Name | Date |
| --- | --- | --- |
| 2,251,277 | Hart | Aug. 5, 1941 |
| 2,391,086 | Crandell | Dec. 18, 1945 |
| 2,413,003 | Sherman | Dec. 24, 1946 |
| 2,448,008 | Baker | Aug. 31, 1948 |
| 2,453,680 | Sweeny | Nov. 9, 1948 |
| 2,461,283 | Jordan | Feb. 8, 1949 |
| 2,464,336 | Michel | Mar. 15, 1949 |
| 2,465,306 | Durand | Mar. 22, 1949 |
| 2,467,440 | Meharg et al. | Apr. 19, 1949 |
| 2,482,545 | Jordan | Sept. 20, 1949 |
| 2,504,955 | Atwood | Apr. 25, 1950 |
| 2,505,025 | Zottu | Apr. 25, 1950 |
| 2,508,752 | Drugmand | May 23, 1950 |